(12) United States Patent
Xu et al.

(10) Patent No.: US 12,088,438 B2
(45) Date of Patent: Sep. 10, 2024

(54) LINEAR EQUALIZATION METHOD AND DEVICE FOR OTFS SYSTEMS

(71) Applicant: Beijing University of Posts and Telecommunications, Beijing (CN)

(72) Inventors: Wenjun Xu, Beijing (CN); Tingting Zou, Beijing (CN); Hui Gao, Beijing (CN); Zhisong Bie, Beijing (CN); Ping Zhang, Beijing (CN); Fengyu Wang, Beijing (CN); Jiaru Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/679,911

(22) Filed: Feb. 24, 2022

(65) Prior Publication Data
US 2022/0182265 A1    Jun. 9, 2022

Related U.S. Application Data

(63) Continuation of application No. PCT/CN2019/125475, filed on Dec. 16, 2019.

(30) Foreign Application Priority Data

Sep. 2, 2019    (CN) .......................... 201910847083.0

(51) Int. Cl.
*H04W 24/02* (2009.01)
*H04L 25/03* (2006.01)

(52) U.S. Cl.
CPC ....... *H04L 25/03878* (2013.01); *H04W 24/02* (2013.01)

(58) Field of Classification Search
CPC ............... H04L 27/0008; H04L 27/206; H04L 27/2602; H04L 27/2636; H04L 27/2639;
(Continued)

(56) References Cited

U.S. PATENT DOCUMENTS

2006/0148506 A1* 7/2006 Hoo .................. H04L 1/206
                                                      455/522
2017/0012749 A1    1/2017 Rakib et al.
(Continued)

FOREIGN PATENT DOCUMENTS

CN    109196812 A    1/2019
CN    109314619 A    2/2019
(Continued)

OTHER PUBLICATIONS

Farhang et al., Low Complexity Modem Structure for OFDM-Based Orthogonal Time Frequency Space Modulation, IEEE Wireless Communications Letters, vol. 7, No. 3, pp. 344-347, dated Jun. 30, 2018.
(Continued)

*Primary Examiner* — Eva Y Puente
(74) *Attorney, Agent, or Firm* — Westbridge IP LLC (57) ABSTRACT

Disclosed is a low-complexity linear equalization method for an Orthogonal Time Frequency Space (OTFS) system. The method may include: receiving a time domain signal passing through a linear time-varying (LTV) channel; sampling the time domain signal to obtain a sampled signal; demodulating the sampled signal to obtain a demodulated signal; performing a Symplectic Finite Fourier Transform (SFFT) on the demodulated signal to obtain a sampled delay-Doppler domain signal; determining an effective channel matrix in a delay-Doppler domain under a restriction of a rectangular window according to a time domain channel matrix; determining a linear equalization matrix according to the effective channel matrix; and equalizing the sampled delay-Doppler domain signal in a low-complexity way according to the linear equalization matrix. The disclosure also discloses a linear equalization device of an OTFS
(Continued)

system for realizing the linear equalization method and a computer-readable storage medium.

17 Claims, 4 Drawing Sheets

(58) Field of Classification Search
CPC ........... H04L 27/2647; H04L 27/26526; H04L 27/26532; H04W 24/02; H04W 72/005; H04W 4/80; H04W 72/044; H04W 72/121; H04W 88/02; H04W 52/52; H04W 72/0446; H04J 11/00; H04J 11/0026; H04J 11/0023; H04J 2011/0016; H04J 2011/0003; H04J 4/00; H04J 13/0059; H04J 13/0062
USPC ........................................................ 375/229
See application file for complete search history.

(56) References Cited

U.S. PATENT DOCUMENTS

| | | | |
|---|---|---|---|
| 2017/0099122 A1* | 4/2017 | Hadani | ................. H04L 5/0048 |
| 2017/0149595 A1* | 5/2017 | Rakib | ..................... H04L 5/001 |
| 2019/0036577 A1 | 1/2019 | Delfeld et al. | |
| 2020/0389268 A1* | 12/2020 | Sathyanarayan | ... H04L 27/0008 |

FOREIGN PATENT DOCUMENTS

| | | |
|---|---|---|
| CN | 109922020 A | 6/2019 |
| CN | 110730145 A | 1/2020 |
| WO | 2019113046 A1 | 6/2019 |

OTHER PUBLICATIONS

First Office Action issued in counterpart Chinese Patent Application No. 201910847083.0, dated May 18, 2020.
International Search Report and Written Opinion issued in corresponding PCT Application No. PCT/CN2019/125475, dated May 28, 2020.

* cited by examiner

LINEAR EQUALIZATION METHOD AND DEVICE FOR OTFS SYSTEMS

CROSS-REFERENCE TO RELATED APPLICATIONS

The present application is a continuation of PCT application PCT/CN2019/125475 entitled "Linear Equalization Method and Device for OTFS System", filed on Dec. 16, 2019, which claims priority of Chinese patent application 201910847083.0, filed on Sep. 10, 2019, the entire contents of which are incorporated herein by reference.

TECHNICAL FIELD

The present application relates to wireless communication technologies, more particularly to a linear equalization method and a linear equalization device for Orthogonal Time Frequency Space (OTFS) systems.

BACKGROUND

Orthogonal Frequency Division Multiplexing (OFDM) is widely used in $5^{th}$ generation (5G) systems because of its advantages such as high efficiencies in the frequency spectrum. However, when a user moves in the system, the orthogonality between subcarriers may be destroyed due to doppler effect, which will lead to inter carrier interferences (ICIs). In this situation, the communication performance of the 5G system may decrease a lot.

OTFS is a new modulation method, which can effectively prevent degradations of the communication performance between users due to doppler effect by utilizing a feature that the delay-Doppler domain channel does not change with time. Specifically, an OTFS system carries information in the delay-Doppler domain. At the transmitter of an OTFS system, each symbol in the delay-Doppler domain is transformed to a time-frequency domain within a certain range through Inverse Symplectic Finite Fourier Transform (IS-FFT). Moreover, at the receiver of an OTFS system, information in the time-frequency domain is transformed to the delay-Doppler domain through Symplectic Finite Fourier Transform (SFFT), and then be equalized and demodulated. In this way, a double dispersion channel can be transformed into an equivalent delay-Doppler domain channel with almost no dispersion, and each symbol in an OTFS frame will experience a relatively constant channel. As a new multi-carrier modulation technology, the OTFS can be applied to high dynamic communication environments effectively and show strong robustness to a high doppler shift.

Due to a sparse characteristic of delay-Doppler channels, most of existing researches on channel equalization of the OTFS system focus on nonlinear equalization using channel sparsity. However, in practical applications, nonlinear equalizations usually have a high complexity and a low practicability. Other existing equalization schemes were studied on a premise of infinite window function condition and ideal channel condition. However, such preconditions are impossible to realize in practical applications. Therefore, these equalization schemes also have a low practicability.

SUMMARY

In view of the above, the present disclosure provides a linear equalization method for an OTFS system.

The linear equalization method for an OTFS system according to some examples of the present disclosure may include: receiving a time domain signal passing through a linear time-varying (LTV) channel; sampling the time domain signal to obtain a sampled signal; demodulating the sampled signal to obtain a demodulated signal; performing a Symplectic Finite Fourier Transform (SFFT) on the demodulated signal to obtain a sampled delay-Doppler domain signal; determining an effective channel matrix in a delay-Doppler domain under a restriction of a rectangular window according to a time domain channel matrix; determining an equalization matrix according to the effective channel matrix; and equalizing the sampled delay-Doppler domain signal according to the equalization matrix.

The present disclosure also provides an electronic device, comprising a memory, a processor, and a computer program stored in the memory and executable on the processor, wherein the processor executes the computer program to implement the linear equalization method for an OTFS system.

The present disclosure also provides a non-transitory computer-readable storage medium, wherein the non-transitory computer-readable storage medium stores computer instructions, and the computer instructions being used to make a computer execute the linear equalization method for an OTFS system.

In the above linear equalization method, devices for the OTFS system, the OTFS receiver may determine the effective channel matrix according to the relationship between the effective channel matrix and the time domain channel matrix, and simplify the equalization in the delay-Doppler domain according to the effective channel matrix. In this way, the equalization matrix may be obtained through a method with a low complexity. It can be seen that, the computational complexity of the linear equalization provided is much less than that of the conventional equalization methods. Moreover, the rectangular window condition is much closer to an actual communication environment. Therefore, it can be applied to high dynamic communication channel environments and it is also easy to be implemented.

BRIEF DESCRIPTION OF DRAWINGS

In order to more clearly explain the examples of the present disclosure or the technical solutions in the prior art, the following is a brief introduction to the drawings to be used in the description of the examples. It is obvious that the drawings described below are only some examples of the present disclosure. For those skilled in the art, without paying creative labor, they can also obtain other drawings from these drawings.

DETAILED DESCRIPTION OF THE EMBODIMENTS

For a better understanding of the objects, aspects and advantages of the present disclosure, references will now be made to the following detailed description taken in conjunction with the accompanying drawings.

It should be noted that, unless defined otherwise, technical or scientific terms used in connection with examples of the present disclosure shall have ordinary meanings understood by those skilled in the art to which this disclosure belongs. As used in this disclosure, the terms "first", "second" and the like do not denote any order, quantity, or importance, but rather are used to distinguish one element from another. The word "comprise", "include" or the like means that an element or an article preceded by the word is inclusive of elements or articles listed after the word and their equivalents, however, does not exclude other elements or articles. Similar terms such as "connect" is not limited to physical or mechanical connections, but may also include electrical connections, whether direct or indirect. "Above", "under", "left" and "right" are used merely to denote relative positional relationships, which may change accordingly when an absolute position of an object being described changes.

Figure 1:
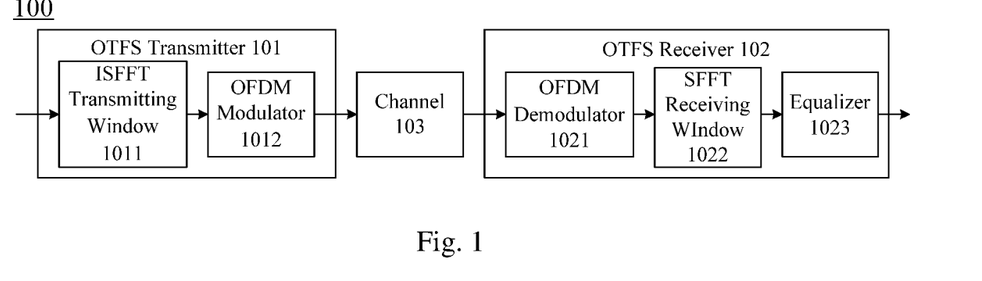
FIG. 1 is a schematic diagram illustrating a structure of an OTFS system 100 according to an example of the present disclosure.

As discussed above, OTFS can be applied to high dynamic communication channel environments effectively and show strong robustness to high doppler shift. FIG. 1 is a schematic diagram illustrating a structure of an OTFS system 100 according to an example of the present disclosure.

As shown in FIG. 1, the OTFS system 100 may include: an OTFS transmitter 101 and an OTFS receiver 102. The OTFS transmitter 101 and the OTFS receiver 102 may transmit signals through channels 103. To be noted, in examples of the present disclosure, the channels 103 may be linear time-varying (LTV) channels.

As shown in FIG. 1, the OTFS transmitter 101 may include: an ISFFT transmitting window 1011 and an OFDM modulator 1012. The OTFS receiver 102 may include: an OFDM demodulator 1021, an SFFT receiving window 1022 and an equalizer 1023.

Compared to a conventional OFDM system, the OTFS system 100 shown in FIG. 1 adds a pre-processing of converting information from the delay-Doppler domain to the time-frequency domain (performed by the ISFFT transmitting window 1011) in the OTFS transmitter 101 and adds a post-processing of converting information from the time-frequency domain to the delay-Doppler domain (performed by the SFFT receiving window 1022) and an equalization (performed by the equalizer 1023) in the OTFS receiver 102.

The present disclosure provides a linear equalization method for an OTFS system to solve the problem of a low practicability of conventional equalization schemes. The method may be implemented by the OTFS receiver 102 of the OTFS system 100 as shown in FIG. 1.

Figure 2:
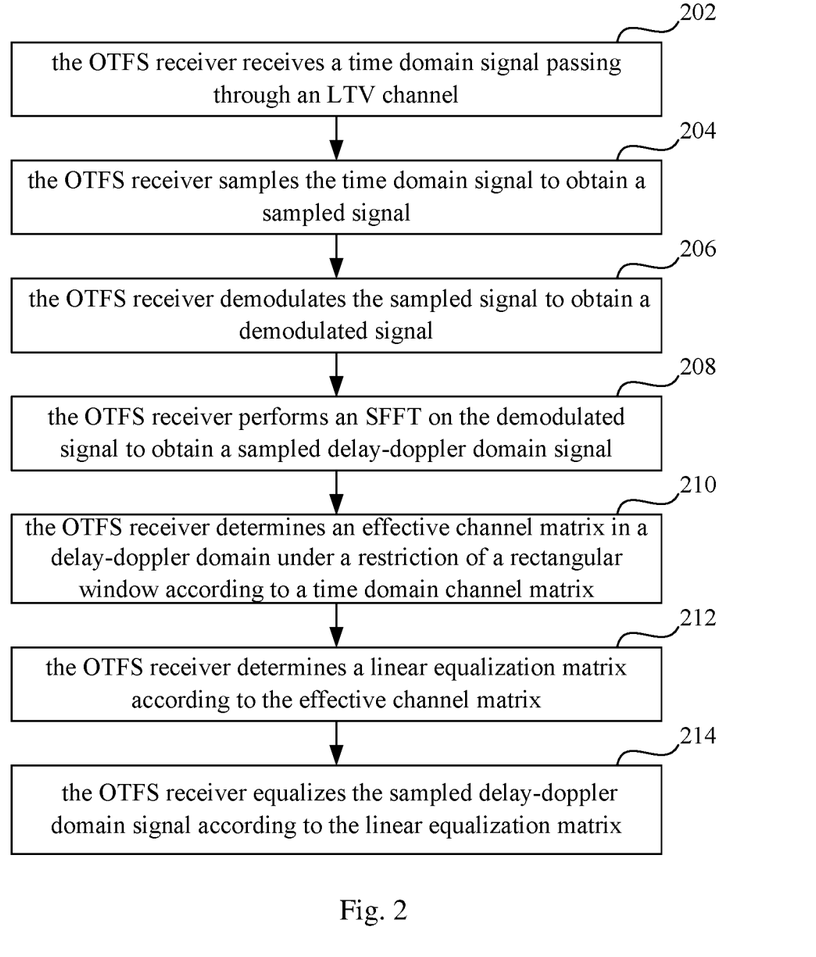
FIG. 2 is a flow chart illustrating a linear equalization method for an OTFS system according to an example of the present disclosure.

FIG. 2 is a flow chart illustrating the linear equalization method of an OTFS system according to an example of the present disclosure. As shown in FIG. 2, the linear equalization method may include the following steps.

In block 202, the OTFS receiver 102 of the OTFS system 100 receives a time domain signal passing through an LTV channel.

In block 204, the OTFS receiver 102 samples the time domain signal to obtain a sampled signal.

In block 206, the OTFS receiver 102 demodulates the sampled signal to obtain a demodulated signal. Here, the demodulation performed in this step may refer to the Wigner Transform.

In block 208, the OTFS receiver 102 performs an SFFT on the demodulated signal to obtain a sampled delay-Doppler domain signal.

In block 210, the OTFS receiver 102 determines an effective channel matrix in a delay-Doppler domain under a restriction of a rectangular window according to a time domain channel matrix.

In block 212, the OTFS receiver 102 determines a linear equalization matrix according to the effective channel matrix.

In block 214, the OTFS receiver 102 equalizes the sampled delay-Doppler domain signal according to the linear equalization matrix.

Specific methods implementing each step of the above linear equalization method would be discussed in detail with reference to the accompany drawings.

In examples of the present disclosure, at the OTFS transmitter 101 of the OTFS system, a modulated symbol with a length of N×M would be mapped to the delay-Doppler domain modulated signal x[k,l], k=1, 2, ..., N, l=1, 2, ..., M.

In this example, the ISFFT transmitting window 1011 in the OTFS transmitter 101 may perform an ISFFT on the delay-Doppler domain modulated signal x[k, l]. Then, the ISFFT transmitting window 1011 may further filter the signal transformed using a rectangular window function with a length of N in the time domain and a length of M in the frequency domain. In this way, a time-frequency domain modulated signal $x_{t-f}$ can be obtained.

Next, the OFDM modulator 1012 in the OTFS transmitter 101 may perform an OFDM modulation on the time-frequency domain modulated signal $x_{t-f}$ to obtain a time domain transmitting signal s(t). In the OFDM modulation, the time-frequency domain modulated signal $x_{t-f}$ would be vectorized and modulated onto carriers.

Then the time domain transmitting signal s(t) would pass through an LTV channel 103 and be received by the OTFS receiver 102 of the OTFS system 100.

To be noted, the process of the time domain transmission signal s(t) passing through the LTV channel 103 can be expressed as a convolution relationship between a channel gain of a multipath channel and the time domain transmission signal s(t).

According to some examples of the present disclosure, the OTFS receiver 102 of the OTFS system 100 may perform the method shown in FIG. 2 to process signals received.

As shown in FIG. 2, in block 202 and 204, the OTFS receiver 102 may first receive the time domain transmission signal s(t) passing through the LTV channel 103 and then sample the signal received to obtain a sampled signal r(k').

In examples of the present disclosure, the sampled signal r(k') may be expressed according to the following expression (1).

$$r(k') = \sum_{l'=1}^{L} h(k', l)s(k' - l') + w(k') \quad (1)$$

Wherein, k' represents a sampling time; l' represents a $l'^{th}$ delay path of the LTV channel; the LTV channel is a multipath channel composed of L delay paths; h(k', l') represents an impulse response of the LTV channel; and w(k') represents an additive white Gaussian noise.

Then, in block 206, the OFDM demodulator 1021 in the OTFS receiver 102 of the OTFS system 100 may demodulate the sampled signal r(k'). Moreover, in block 208, the SFFT receiving window 1022 may perform an SFFT on the sampled signal r(k') to obtain a sampled delay-Doppler domain signal y[k, l], k=1, 2, . . . , N, l=1, 2, . . . , M.

According to some examples of the present disclosure, a matrix representation of the sampled delay-Doppler domain signal y[k, l] may be expressed as the following expression (2).

$$y = (F_N \otimes F_M^H)V(I_N \otimes F_M)\tilde{H}(I_N \otimes F_M^H)U(F_N^H \otimes F_M)x + w \quad (2)$$

Wherein, y represents a NM×1 column vector obtained by stacking the columns of a matrix whose element is the sampled delay-Doppler domain signal y[k, l] into a vector; x represents a corresponding NM×1 column vector obtained by stacking the columns of a matrix whose element is the delay-Doppler domain modulated signal x[k, l] into a vector; $F_N$ represents an N-point Fourier transform matrix; $F_M$ represents an M-point Fourier transform matrix; $F_N^H$ represents an N-point inverse Fourier transform matrix; $F_M^H$ represents an M-point inverse Fourier transform matrix; $I_N$ is an N-order identity matrix; ⊗ represents a kronecker product; V represents a receiving window function; U represents a transmitting window function; and w represents a noise vector.

In the above expression, the matrix $\tilde{H}$=diag $\tilde{H}_1, \tilde{H}_2, \ldots, \tilde{H}_N$ ] is a NM×NM block diagonal matrix, representing a time domain channel matrix under a restriction that a length of a cyclic prefix is bigger than a maximum delay of the multipath channel. Where, $\tilde{H}_p$ represents a time domain channel sub-matrix experienced by the $p^{th}$ symbol.

To be noted that under the restriction that the length of the cyclic prefix is bigger than the maximum delay of the multipath channel, there would be no inter-symbol interference (ISI). Therefore, the structure of the time domain channel sub-matrix $\tilde{H}_p$ only relates to the positions of the multipath delay on the delay axis.

According to some examples of the present disclosure, the method of the OFDM modulator 1012 in the OTFS transmitter 101 performing an OFDM processing on the time-frequency domain modulated signal $x_{t-f}$ to obtain a time domain transmitting signal s(t) may include the following steps.

At first, the OFDM modulator 1012 may perform an Inverse Fast Fourier Transform (IFFT) on the time-frequency domain modulated signal $x_{t-f}$ to transform the time-frequency domain modulated signal $x_{t-f}$ into a time domain signal.

Then, the OFDM modulator 1012 may add a CP with a proper length to the time domain signal to obtain a first intermediate signal.

At last, the OFDM modulator 1012 may vectorize the first intermediate signal through a rectangular transmitting window function to obtain the time domain transmitting signal s(t).

In some examples of the present disclosure, based on the above sampled delay-Doppler domain signal, in block 210, the effective channel matrix of the OTFS system in the delay-Doppler domain under a restriction of a rectangular window may be determined by the following steps.

At first, the effective channel matrix $H_{eff}$ of the OTFS system in the delay-Doppler domain can be determined according to the following expression (3) based on the sampled delay-Doppler domain signal y.

$$H_{eff} = (F_N \otimes F_M^H)V(I_N \otimes F_M)\tilde{H}(I_N \otimes F_M^H)U(F_N^H \otimes F_M) \quad (3)$$

Moreover, under the restriction of a rectangular window, the receiving window function V and the transmitting window function U may satisfy the following expression:

$$V, U = I_{MN} \in \mathbb{C}^{MN \times MN}$$

In this way, the effective channel matrix $H_{eff}$ of the OTFS system in the delay-Doppler domain as illustrated in expression (3) can be simplified as the following expression (4):

$$H_{eff} = (F_N \otimes I_M)\tilde{H}(F_N^H \otimes I_M) \quad (4)$$

Further, by expending the above expression (4), the effective channel matrix $H_{eff}$ can be decomposed into N×N first cyclic sub-matrices $H_{eff_{i'',k''}} \in \mathbb{C}^{M \times M}$; where, k''=1,2, . . . , N, i''=1, 2, . . . , M.

Specifically, the first cyclic matrix $H_{eff_{i'',k''}}$ composing the effective channel matrix $H_{eff}$ can be expressed as the following expression (5):

$$H_{eff_{i'',k''}} = \sum_{p=1}^{N} f_{i''p} f'_{pk''} \tilde{H}_p \quad (5)$$

Wherein, $f_{i''p}$ represents the element in the i'' row and p column of the Fourier transform matrix; $f_{pk}'$—represents the element in the p row and k'' column of the inverse Fourier transform matrix.

Further, based on the element of the discrete Fourier transform matrix $f_{i''p}$ and the element of the inverse discrete Fourier transform matrix $f_{pk}'$—the first cyclic matrix can be further simplified as the following expression (6):

$$\sum_{p=1}^{N} f_{i''p} f'_{pk''} = \sum_{p=1}^{N} e^{-j\frac{2\pi}{N}(i''-1)(p-1)} e^{j\frac{2\pi}{N}(p-1)(k''-1)} = \sum_{p=1}^{N} e^{j\frac{2\pi}{N}(p-1)(k''-i'')} \quad (6)$$

It can be seen from the above expression (6), the first cyclic matrix $H_{eff_{i'',k''}}$ can be determined by the difference of its subscripts and has nothing to do with the specific values of the subscripts. In view of the above, by defining a new parameter n=[k''−i'']$_N$+1, the cyclic matrix can be further simplified as the following expression (7):

$$H_{eff_{i'',k''}} = \sum_{p=1}^{N} e^{j\frac{2\pi}{N}(p-1)(k''-i'')} \tilde{H}_p = A_n \quad (7)$$

Therefore, it can be seen that the effective channel matrix $H_{eff}$ is a block circulant matrix composed of N first cyclic matrices $A_n$. Further, each first cyclic matrix $A_n$ can be determined by the time domain channel sub-matrix $\tilde{H}_p$ as illustrated in the above expression (7).

In view of the forgoing, after determining all the first cyclic matrices $A_n$, the effective channel matrix $H_{eff}$ of the OTFS system in the delay-Doppler domain under a restriction of a rectangular window can be expressed as the following expression (8).

$$H_{eff} = \begin{pmatrix} A_1 & A_2 & \cdots & A_{N-1} & A_N \\ A_N & A_1 & & A_{N-2} & A_{N-1} \\ \vdots & & \ddots & & \vdots \\ A_3 & A_4 & \cdots & A_1 & A_2 \\ A_2 & A_3 & & A_N & A_1 \end{pmatrix} \quad (8)$$

Figure 3:
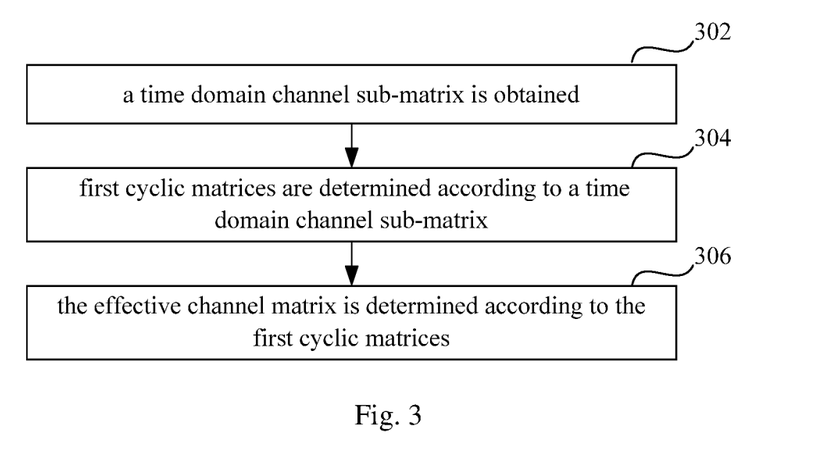
FIG. 3 is a schematic diagram illustrating a method for determining the effective channel matrix of the OTFS system according to an example of the present disclosure.

In view of the above, according to some examples of the present disclosure that, in the above block 210, the effective channel matrix of the OTFS system in the delay-Doppler domain under a restriction of a rectangular window can be determined according to the time domain channel matrix. FIG. 3 is a schematic diagram illustrating a method for determining the effective channel matrix of the OTFS system according to an example of the present disclosure. As shown in FIG. 3, the method may include the following steps:

In block 302, the time domain channel sub-matrix $\tilde{H}_p$ is obtained.

One would understand that, the time domain channel sub-matrix $\tilde{H}_p$ can be obtained through channel estimation methods. Specifically, it can be constructed by using the channel gain in the time domain and the input-output relationship under LTV channels in time domain.

In block 304, the N first cyclic matrices $A_n$ are determined according to a time domain channel sub-matrix $\tilde{H}_p$.

Specifically, the following expression (9) can be obtained by simplifying the above expression (7). Therefore, first cyclic matrices $A_n$ can be determined according to the following expression (9). That is, the cyclic matrix $A_n$ can be determined by an FFT result on the time domain channel matrix $\tilde{H}_p$.

$$A_n = \sum_{p=1}^{N} e^{j\frac{2\pi}{N}(p-1)(k''-i'')} \tilde{H}_p = FFT_{Mtx}(\tilde{H}_p) \quad (9)$$

Wherein, $\tilde{H}_p$ represents the channel sub-matrix in the time domain in the channel matrix $\tilde{H}=\text{diag}[\tilde{H}_1, \tilde{H}_2, \ldots, \tilde{H}_N]$; and an operator $FFT_{Mtx}(\ )$ represents a Fast Fourier Transform (FFT) operation on a set of matrices, and the result of the transform is also a series of matrices. The main difference between the operator $FFT_{Mtx}(\ )$ and a conventional Fourier transform is the object of the operator $FFT_{Mtx}(\ )$ is a series of matrices not a series of numbers, and the result of the $FFT_{Mtx}(\ )$ is also a series of matrices. Since a Fourier transform is a linear transform, the structure of $A_n$ is the same with that of $\tilde{H}_p$.

In block 306, the effective channel matrix $H_{eff}$ is determined according to the N first cyclic matrices $A_n$.

As stated above, the effective channel matrix $H_{eff}$ of the OTFS system in the delay-Doppler domain under a restriction of a rectangular window is a block circulant matrix that can be expressed as the above expression (8), the effective channel matrix $H_{eff}$ then can be determined according to the above expression (8).

In some examples of the present disclosure, in the above block 212, the linear equalization matrix can be determined according to the effective channel matrix.

Specifically, in some examples of the present disclosure, the OTFS receiver may use a zero-forcing equalization method, therefore, the effective channel matrix is used to determine the zero-forcing equalization matrix.

Moreover, the zero-forcing equalization process in the delay-Doppler domain may be simplified through the effective channel matrix $H_{eff}$.

In some examples of the present disclosure the zero-forcing equalization matrix can be expressed as the following expression (10).

$$W_{ZF}=H_{eff}^{-1} \quad (10)$$

That is, the zero-forcing equalization matrix $W_{ZF}$ can be obtained by inversing the effective channel matrix $H_{eff}$.

Since the effective channel matrix $H_{eff}$ is a block circulant matrix, the zero-forcing equalization matrix $W_{ZF}$ is also a block circulant matrix. In this example, the zero-forcing equalization matrix $W_{ZF}$ can be determined according to the following expression (11).

$$W_{ZF}=H_{eff}^{-1}=\text{circ}\{B_1, B_2, \ldots, B_N\} \quad (11)$$

Further, a relationship between second circulant matrices $B_q$ composing the zero-forcing equalization matrix $W_{ZF}$ and the first circulant matrices $A_n$ can be determined according to the relationship between the effective channel matrix $H_{eff}$ and the equalization matrix. That is, the relationship between the second circulant matrices $B_q$ and the first circulant matrices $A_n$ can be expressed as the following expression (12) and (13).

$$\begin{cases} B_q = \frac{1}{N}\sum_{t=1}^{N}\left(e^{j\frac{2\pi(p-1)}{N}}\right)^{N-t+1} S_t^{-1} = \frac{1}{N}FFT_{Mtx}(S_t^{-1}) & (12) \\ S_t = \sum_{n=1}^{N} e^{j\frac{(t-1)(k-1)}{N}} A_n = IFFT_{Mtx}(A_n) & (13) \end{cases}$$

Wherein, $B_q, S_t \in \mathbb{H}_v \mathbb{H}_z^{M \times M}$; $S_t$ represents a first intermediate matrix.

Then, the first intermediate matrix can be obtained by substituting the above expression (9) into the above expression (13).

Further, the second circulant matrices $B_q$ may be determined by inversing the first intermediate matrix $S_t$. Then, the zero-forcing equalization matrix $W_{ZF}$ can be obtained according to the circulant matrices $B_q$.

Figure 4:
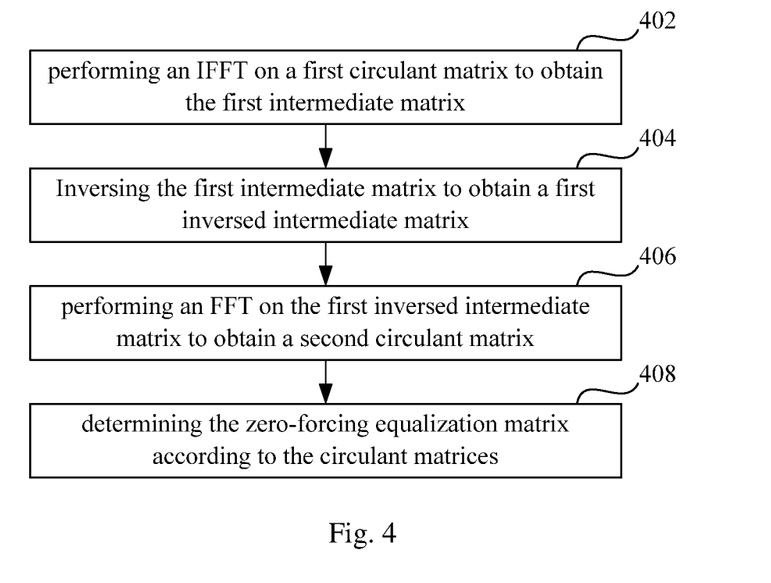
FIG. 4 is a schematic diagram illustrating a method for determining a zero-forcing equalization matrix according to an effective channel matrix according to an example of the present disclosure.

In view of the above descriptions, when a zero-forcing equalization method is adopted, the OTFS receiver may determine the zero-forcing equalization matrix $W_{ZF}$ through the method shown in FIG. 4.

As shown in FIG. 4, the method may include the following steps.

In block 402, for each of the first circulant matrices $A_n$, performing an IFFT on the first circulant matrices $A_n$ to obtain the first intermediate matrix $S_t$.

In block 404, inversing the first intermediate matrix $S_t$ to obtain a first inversed intermediate matrix $S_t^{-1}$.

In block 406, performing an FFT on the first inversed intermediate matrix $S_t^{-1}$ to obtain a second circulant matrix $B_q$ of the zero-forcing equalization matrix $W_{ZF}$.

In block 408, determining the zero-forcing equalization matrix $W_{ZF}$ according to the circulant matrices $B_q$ according the above expression (11).

According to some examples of the present disclosure, in block 214, after determining the zero-forcing equalization matrix $W_{ZF}$, the OTFS receiver may further equalization the sampling delay-Doppler domain signal through the zero-forcing equalization matrix $W_{ZF}$.

In the above linear equalization method for the OTFS system, the OTFS receiver may determine the effective channel matrix according to the relationship between the effective channel matrix and the time domain channel matrix, and simplify the zero-forcing equalization matrix in the delay-Doppler domain according to the effective channel matrix. In this way, the zero-forcing equalization matrix may be obtained through a method with a low complexity. One skilled in the art would understand that, a computational complexity of a conventional zero-forcing equalization would be $\mathcal{O}((NM)^3)$. However, in examples of the present disclosure, the computational complexity of the zero-forcing equalization would be reduced to $\mathcal{O}(M^2 N \log N + NM^2 D_P)$. Wherein, $D_P$ represents a coordinate value of a path with a maximum delay among the multipath on a delay axis in the delay-Doppler domain. It can be seen that, the computational complexity of the linear equalization provided is much less than that of the conventional zero-forcing equalization. Therefore, it is easy to be implemented.

In some other examples of the present disclosure, the OTFS receiver may use a minimum mean square error (MMSE) equalization method, therefore, an MMSE equalization matrix is obtained from the effective channel matrix.

Specifically, the MMSE equalization process in the delay-Doppler domain may be simplified through the effective channel matrix $H_{eff}$.

In some examples of the present disclosure the MMSE equalization matrix can be expressed as the following expression (14).

$$W_{MMSE} = (H_{eff}^H H_{eff} + \sigma^2 I)^{-1} H_{eff}^H \qquad (14)$$

Wherein, $H_{eff}^H$ represents a conjugate transpose matrix of the effective channel matrix $H_{err}$; $\sigma^2$ represents a variance of channel noises; and I represents an identity matrix with a same dimension with the effective channel matrix $H_{eff}$.

Based on the first circulant matrices $A_n$ composing the effective channel matrix $H_{eff}$, the expression $H_{eff}^H H_{eff} + \sigma^2 I$ in the above expression (14) can be expended as the following expression (15), and the expression can be named as a second intermediate matrix R.

$$R = \begin{bmatrix} \sum_{n=1}^{N} A_n^H A_{[n]_N} + \sigma^2 I & \sum_{n=1}^{N} A_n^H A_{[n+1]_N} & \cdots & \sum_{n=1}^{N} A_n^H A_{[n+N-1]_N} \\ \sum_{n=1}^{N} A_n^H A_{[n+N-1]_N} & \sum_{n=1}^{N} A_n^H A_{[n]_N} + \sigma^2 I & & \sum_{n=1}^{N} A_n^H A_{[n+N-2]_N} \\ \vdots & & \ddots & \vdots \\ \sum_{n=1}^{N} A_n^H A_{[n+1]_N} + \sigma^2 I & \sum_{n=1}^{N} A_n^H A_{[n+2]_N} + \sigma^2 I & \cdots & \sum_{n=1}^{N} A_n^H A_{[n]_N} + \sigma^2 I \end{bmatrix} \qquad (15)$$

Wherein, $[\cdot]_N$ represents a modulo operation, and $[N]_N = N$.

A second inversed intermediate matrix as shown in the following expression (16) can be obtained by inversing the second intermediate matrix as shown in the above expression (15).

$$R^{-1} = \begin{pmatrix} C_1 & C_2 & \cdots & C_{N-1} & C_N \\ C_N & C_1 & & C_{N-2} & C_{N-1} \\ \vdots & & \ddots & & \vdots \\ C_3 & C_4 & \cdots & C_1 & C_2 \\ C_2 & C_3 & & C_N & C_1 \end{pmatrix} \qquad (16)$$

Further, by multiplying the second inversed intermediate matrix and the effective channel matrix $H_{eff}$, an MMSE equalization matrix $W_{MMSE}$ can be obtained.

$$W_{MMSE} = \begin{bmatrix} \sum_{n=1}^{N} C_n A_{[n]_N}^H & \sum_{n=1}^{N} C_n A_{[n-1]_N}^H & \cdots & \sum_{n=1}^{N} C_n A_{[n-(N-1)]_N}^H \\ \sum_{n=1}^{N} C_n A_{[n-(N-1)]_N}^H & \sum_{n=1}^{N} C_n A_{[n]_N}^H & & \sum_{n=1}^{N} C_n A_{[n-(N-2)]_N}^H \\ \vdots & & \ddots & \vdots \\ \sum_{n=1}^{N} C_n A_{[n-1]_N}^H & \sum_{n=1}^{N} C_n A_{[n-2]_N}^H & \cdots & \sum_{n=1}^{N} C_n A_{[n]_N}^H \end{bmatrix} \qquad (17)$$

Figure 5:
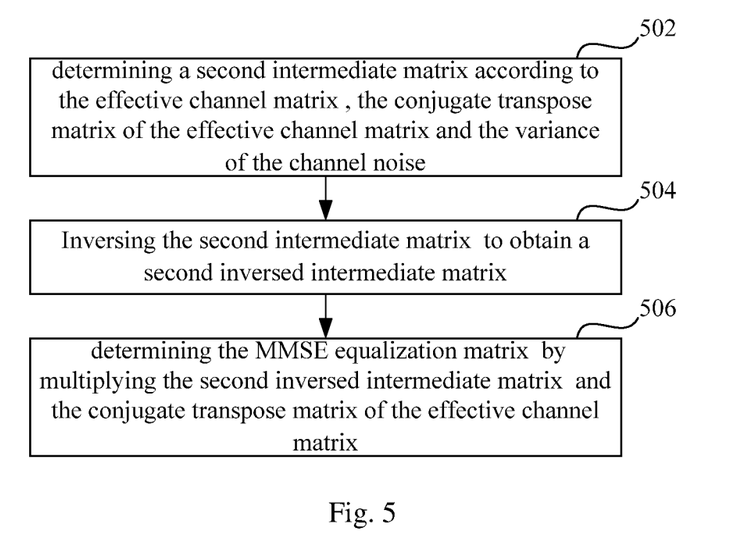
FIG. 5 is a schematic diagram illustrating a method for determining a Minimum Mean Square Error (MMSE) equalization matrix according to an effective channel matrix according to an example of the present disclosure.

In view of the above, when an MMSE equalization method is adopted, the OTFS receiver may determine the MMSE equalization matrix $W_{MMSE}$ through the method shown in FIG. 5.

As shown in FIG. 5, the method may include the following steps.

In block 502, determining a second intermediate matrix R according to the effective channel matrix $H_{eff}$, the conjugate transpose matrix of the effective channel matrix and the variance of the channel noise.

In block 504, inversing the second intermediate matrix R to obtain a second inversed intermediate matrix $R^{-1}$.

In block 506, determining the MMSE equalization matrix $W_{MMSE}$ by multiplying the second inversed intermediate matrix $R^{-1}$ and the conjugate transpose matrix of the effective channel matrix.

According to some examples of the present disclosure, in block 206, after determining the MMSE equalization matrix $W_{MMSE}$, the OTFS receiver may further equalization the sampling delay-Doppler domain signal through the MMSE equalization matrix $W_{MMSE}$.

In the above linear equalization method for the OTFS system, the OTFS receiver may determine the effective channel matrix according to the relationship between the effective channel matrix and the time domain channel matrix, and simplify the MMSE equalization matrix in the delay-Doppler domain according to the effective channel matrix. In this way, the MMSE equalization matrix may be obtained through a method with a low complexity. One skilled in the art would understand that, a computational complexity of a conventional MMSE equalization would be $\mathcal{O}((NM)^3)$. However, in examples of the present disclosure, the computational complexity of the MMSE equalization would be reduced to $\mathcal{O}(M^2N \log N + N^2M^2D_P)$. It can be seen that, the computational complexity of the linear equalization claimed is much less than that of the conventional linear equalization. Therefore, it is easy to be implemented.

In some examples of the present disclosure, the inversing operation in the above step 404 and 504 may be further simplified.

Figure 6:
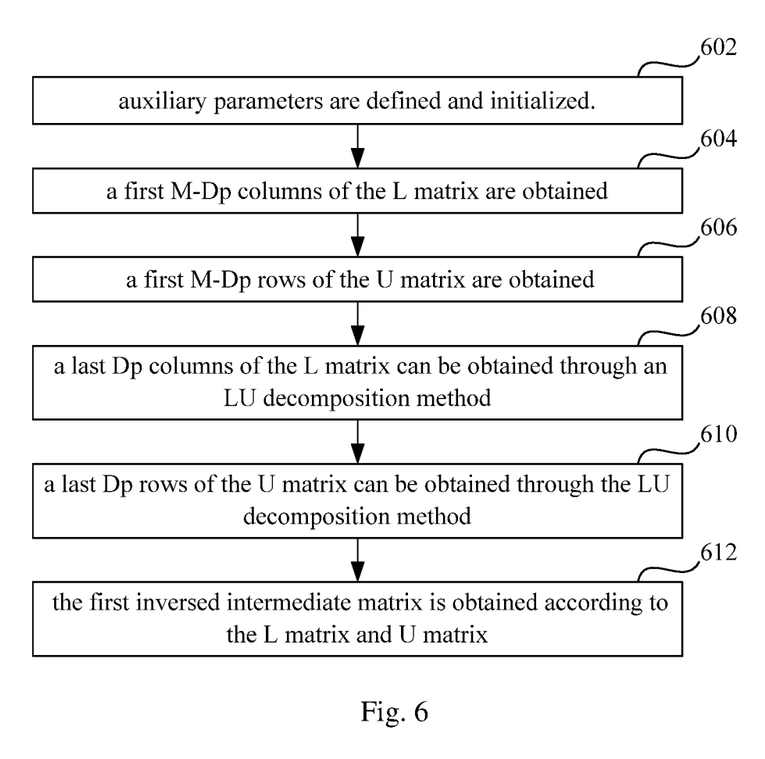
FIG. 6 is a schematic diagram illustrating the process of simplified inversing operation according to some examples of the present disclosure.

The simplified inversing operation would be described in detail taking inversing the first intermediate matrix $S_t$ as an example. The process of inversing the second intermediate matrix would be the same with the process of inversing the first intermediate matrix $S_t$. Specifically, FIG. 6 is a schematic diagram illustrating the process of simplified inversing operation according to some examples of the present disclosure. As shown in FIG. 6, the simplified inversing operation may be implemented through the following steps.

In block 602, some auxiliary parameters are defined and initialized. These auxiliary parameters defined may include an L matrix, a U matrix, an intermediate variable matrix, and an auxiliary vector.

Specifically, the initialization process of the auxiliary parameters may include: initializing the L matrix as $L=I_M$; initializing the U matrix as $U=0_M$; initializing the intermediate variable matrix as $Y=0_M$; and initializing the auxiliary vector as $d=[d_{chan},M-D_P]$. Where, $d_{chan}=[D_1, D_2, D_3, \ldots, D_P]$, which is a vector representing delays of the multipath; where, P represents a number of paths of the multipath; $D_1, D_2, D_3, \ldots, D_P$ represents a coordinate value of a delay of each path on a delay axis in the delay-Doppler domain. The values of $D_1, D_2, D_3, \ldots, D_P$ can be determined according to an actual delay of each path and a resolution of the delay axis. To be noted, these values are all integers.

In block 604, a first $M-D_P$ columns of the L matrix are obtained according to the expression: $L(i+D_P,i)=S_t(i+D_P,i)/S_t(I,i)$; where, $L(i+D_P, I)$ represents an element at a position of row $i+D_P$ and column i in the L matrix; and i is a first cyclic variable, where $1\leq i\leq M-D_P$.

It should be noted that, each column of the first $M-D_P$ columns of the L matrix only has P values. In this case, the first cyclic variable i is set, which increases from 1 to $M-D_P$ one by one. In the $i^{th}$ loop, the P values of the column i of the L matrix can be calculated according to the expression $L(i+D_P,i)=S_t(i\ D_P,i)/S_t(i,i)$.

In block 606, a first $M-D_P$ rows of the U matrix are obtained according to the expression: $U(\xi,:)=S_t(\xi,:)-\Sigma_{k=2}{}^n\Sigma_{j=1}{}^M L(\xi,\xi-D_k)U(\xi-D_k,j)$; where, $U(\xi,:)$ represents row $\xi$ of the U matrix; $S_t(\xi,:)$ represents row of the first intermediate matrix $S_t$; the parameter $\xi$ increases from $D_p+1$ to $D_{p+1}$ one by one; and p is a second cyclic variable, where $1\leq p\leq P+1$.

By setting the second cyclic variable p increasing from 1 to P+1 one by one, in each loop, row $D_p+1$ to row $D_{p+1}$ of the U matrix can be calculated. In this case, by defining a vector increasing from $D_p+1$ to $D_{p+1}$ one by one, row of the U matrix can be expressed as $U(\xi,:)=S_t(\xi,:)-\Sigma_{K=2}{}^n\Sigma_{j=t}{}^M L(\xi,\xi-D_k)U(\xi-D_k,j)$.

In block 608, a last $D_P$ columns of the L matrix can be obtained through an LU decomposition method.

In block 610, a last $D_P$ rows of the U matrix can be obtained through the LU decomposition method.

In this way, the L matrix L and the U matrix U can be obtained as a result.

In block 612, the first inversed intermediate matrix $S_t^{-1}$ is obtained according to the L matrix and U matrix.

Specifically, the process of block 612 may include the following steps:

1) Setting a third cyclic variable n increasing from 1 to P one by one.

2) In loop n, setting a vector k increasing from $d(n)+1$ to $d(n+1)$ one by one. Where, $d(n)$ represents a $n^{th}$ element in the vector d; $d(n+1)$ represents a $n+1^{th}$ element in the vector d.

3) Calculating the row k of the intermediate variable matrix Y according to the following expression $Y(k,:)=I(k,:)-\Sigma_{i=1}{}^n(k,k-d(i)Y(k-d(i),:)$. In this way, a last $M-D_p$ columns of the intermediate variable matrix Y would be obtained.

4) Setting a fourth cyclic variable k increasing from $D_P+1$ to M one by one.

5) In loop k, the row k of the intermediate variable matrix Y can be calculated according to the following expression $Y(k,:)=I(k,:)-L(k,1:k-1)Y(1:k-1,:)$.

6) Setting a fifth cyclic variable t decreasing from N to 1 one by one.

7) In loop t, setting the variable f represents the bigger one between $M-D_p$ and $k+1$. Obtain row t of the inversed matrix $S_t^{-1}$ through $S_t^{-1}(t,:)=Y(t,:)-U(t,f:M)X(f:M,:)/U(t,t)$. Then the inversed matrix $S_t^{-1}$ of the matrix $S_t$ can be determined.

In the linear equalization method for the OTFS system, when simplifying the zero-forcing equalization method or the MMSE equalization method in the delay-Doppler domain according to the effective channel matrix and the relationship between the effective channel and the time domain channel, a low complexity inversion method is adopted which avoids an inversion of a full-scale matrix, and reduces the computational complexity greatly.

Figure 7:
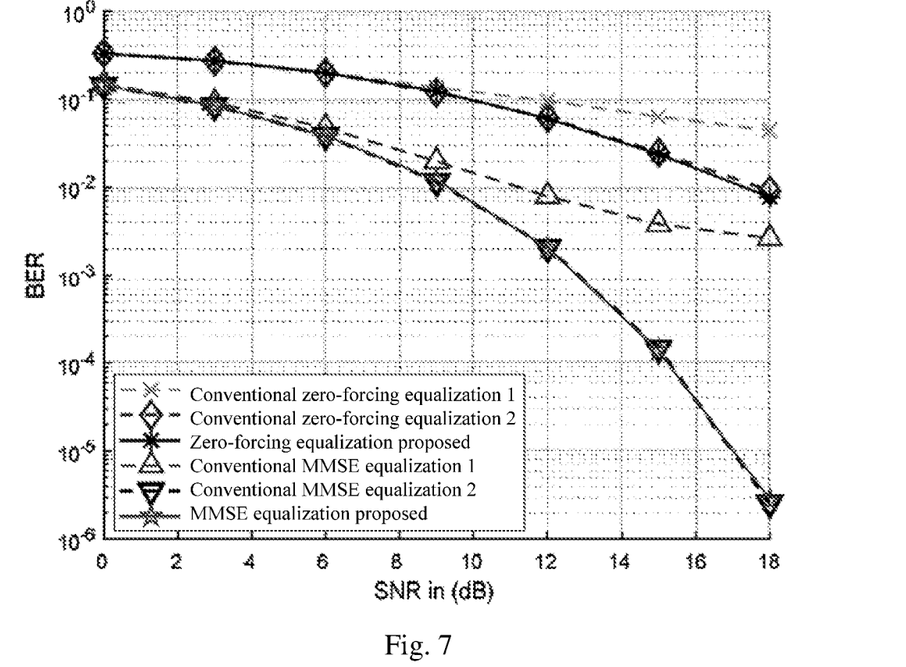
FIG. 7 is a schematic diagram illustrating simulated bit error rates (BERs) of the OTFS system while implementing the linear equalization methods according to examples of the present disclosure and other conventional equalization method.

FIG. 7 is a schematic diagram illustrating simulated bit error rates (BERs) of the OTFS system while implementing the linear equalization method according to examples of the present disclosure. FIG. 7 further illustrates simulated BERs of conventional zero-forcing equalization methods and simulated BERs of conventional MMSE equalization methods. Specifically, in FIG. 7, the conventional zero-forcing equalization 1 refers to a conventional zero-forcing equalization method under an assumption of an ideal window. The conventional zero-forcing equalization 2 refers to a conventional zero-forcing equalization method without any restriction. The conventional MMSE equalization 1 refers to a conventional MMSE equalization method under an assumption of an ideal window. The conventional MMSE equalization 2 refers to a conventional MMSE equalization method without any restriction.

It can be seen from FIG. 7 that the simulated BERs of the low complexity zero-forcing equalization method adopted by the present disclosure are basically the same as those of the conventional zero-forcing equalization method. Moreover, the simulated BERs of the low complexity MMSE equalization method adopted by the present disclosure are basically the same as those of the conventional MMSE equalization method.

Figure 8:
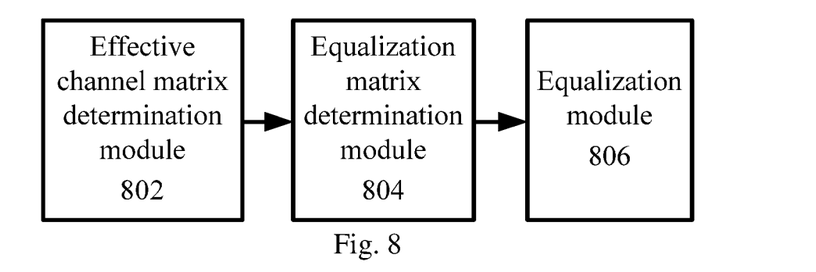
FIG. 8 is a schematic diagram illustrating a structure of a linear equalization device for an OTFS system according to an example of the present disclosure.

Based on the above linear equalization methods, the present disclosure also provides a linear equalizer for an OTFS system. The linear equalizer proposed may be used to replace the equalizer 1023 of the OTFS system shown in FIG. 1. FIG. 8 is a schematic diagram illustrating the structure of the linear equalizer for the OTFS system according to an example of the present disclosure.

As shown in FIG. 8, the linear equalizer for the OTFS system may include: an effective channel matrix determination module 802, an equalization matrix determination module 804, and an equalization module 806.

According to examples of the present disclosure, the effective channel matrix determination module 802 is configured to determine an effective channel matrix of the OTFS system in a delay-Doppler domain under a restriction of a rectangular window.

The equalization matrix determination module 804 is configured to determine a linear equalization matrix according to the effective channel matrix.

The equalization module 806 is configured to equalize sampling signals received according to the linear equalization matrix.

According to examples of the present disclosure, the effective channel matrix determination module 802, the equalization matrix determination module 804 and the equalization module 806 can be implemented by the methods illustrated in FIG. 2 to FIG. 6.

Figure 9:
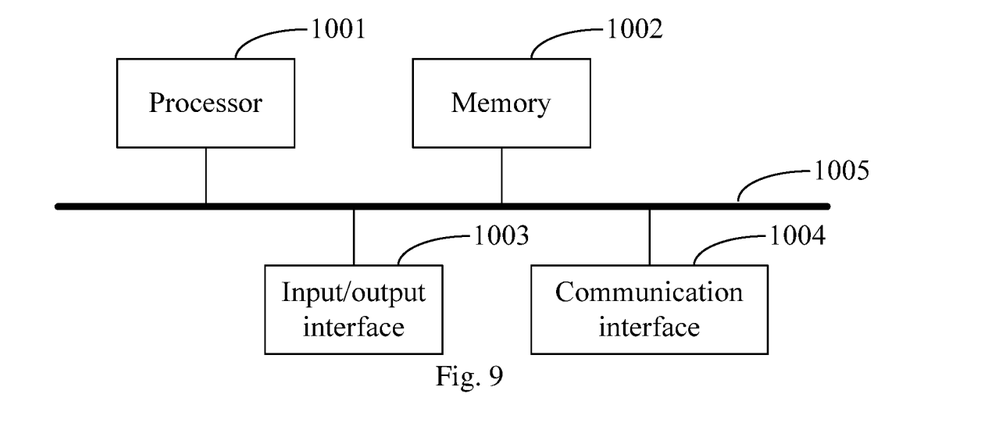
FIG. 9 is a schematic diagram illustrating a structure of an electrical device according to an example of the present disclosure.

Based on the above linear equalization methods and the linear equalization device, the present disclosure also provides an electrical device for implementing the linear equalization methods. FIG. 9 is a schematic diagram illustrating a structure of an electrical device according to an example of the present disclosure.

As shown in FIG. 9, the electronic device may include one or more processors 1001, a memory 1002. In FIG. 9, only one processor 1001 is illustrated. The electronic device may further include an input/output interface 1003, a communication interface 1004, and a bus 1005. The processor 1001, the memory 1002, the input/output interface 1003, and the communication interface 1004 may couple to each other via the bus 1005.

To be noted, a computer program stored in the memory and executable on the processor, wherein the processor executes the program to implement the linear equalization method.

The processor 1001 may execute the relevant procedures by virtue of a general central processing unit (CPU), a microprocessor, an application specific integrated circuit (ASIC), or one or more integrated circuits, so as to implement the technical solution provided by the examples of the description.

The memory 1002 may be implemented by a read only memory (ROM), a random-access memory (RAM), a static memory device and a dynamic memory device, etc. The memory 1002 may store an operating system and other application procedures. When the technical solution provided by the example of the description is implemented via the software or the hardware, the related procedure codes are stored in the memory 1002 and revoked by the processor 1001.

The I/O interface 1003 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1004 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1005 includes a passage which transmits information among various components (for example, the processor 1001, the memory 1002, the I/O interface 1003 and the communication interface 1004) on the device.

It should be noted that, although the above-mentioned device merely shows the processor 1001, the memory 1002, the I/O interface 1003 and the communication interface 1004 and the bus 1005, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples is used for implementing the corresponding linear equalization method in any one of the foregoing examples, and has the beneficial effects of the corresponding method examples, which are not repeated in detail.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should also be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transitory computer readable storage medium which stores a computer instruction used for enabling the computer to perform the linear equalization method of an OTFS system according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the linear equalization method of an OTFS system according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g., circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A linear equalization method for an Orthogonal Time Frequency Space (OTFS) system implemented by an OTFS receiver, comprising:
   receiving a time domain signal passing through a linear time-varying (LTV) channel;
   sampling the time domain signal to obtain a sampled signal;
   demodulating the sampled signal to obtain a demodulated signal;
   performing a Symplectic Finite Fourier Transform (SFFT) on the demodulated signal to obtain a sampled delay-Doppler domain signal;
   determining an effective channel matrix in a delay-Doppler domain under a restriction of a rectangular window according to a time domain channel matrix;
   determining a linear equalization matrix according to the effective channel matrix; and
   equalizing the sampled delay-Doppler domain signal according to the linear equalization matrix.

2. The linear equalization method of claim 1, wherein, the effective channel matrix $H_{eff}$ is a block circulant matrix composed of N first circulant matrices $A_n$.

3. The linear equalization method of claim 2, wherein, determining an effective channel matrix in a delay-Doppler domain under a restriction of a rectangular window according to a time domain channel matrix comprises:
   obtaining a time domain channel sub-matrix $\tilde{H}_p$ from the time domain channel matrix; wherein, $\tilde{H}_p$ represents the time domain channel sub-matrix of the time domain channel matrix $\tilde{H}=\text{diag}[\tilde{H}_1, \tilde{H}_2, \ldots, \tilde{H}_N]$ experienced by the $p^{th}$ symbol; $\tilde{H}=\text{diag}[\tilde{H}_1, \tilde{H}_2, \ldots, \tilde{H}_N]$ is a NM×NM block diagonal matrix, which represents the time domain channel matrix when a length of a cyclic prefix is greater than a maximum delay of the LTV channel;
   determining each first circulant matrices $A_n$ based on the time domain channel sub-matrix $\tilde{H}_p$; and
   determining the effective channel matrix $H_{eff}$ based on the first circulant matrices $A_n$.

4. The linear equalization method of claim 3, wherein, determining each first circulant matrices $A_n$ based on the time domain channel sub-matrix $\tilde{H}_p$ comprises:
   determining the circulant matrices $A_n$ according to the following equation:

$$A_n = \text{FFT}_{Mtx}(\tilde{H}_p)$$

wherein, $\text{FFT}_{Mtx}(\ )$ represents a Fast Fourier Transform operation on a set of matrices.

5. The linear equalization method of claim 3, wherein, determining the effective channel matrix $H_{eff}$ based on the circulant matrices $A_n$ comprises:
   determining the effective channel matrix $H_{eff}$ according to the following equation:

$$H_{eff} = \begin{pmatrix} A_1 & A_2 & \ldots & A_{N-1} & A_N \\ A_N & A_1 & & A_{N-2} & A_{N-1} \\ \vdots & & \ddots & & \vdots \\ A_3 & A_4 & \ldots & A_1 & A_2 \\ A_2 & A_3 & & A_N & A_1 \end{pmatrix}.$$

6. The linear equalization method of claim 2, wherein, the linear equalization matrix is a zero-forcing equalization matrix $W_{ZF}$; wherein,
   determining the linear equalization matrix according to the effective channel matrix comprises: determining the zero-forcing equalization matrix according to the following expression:

$$W_{ZF}=H_{eff}^{-1}.$$

7. The linear equalization method of claim 2, wherein, the linear equalization matrix is a zero-forcing equalization matrix $W_{ZF}$; wherein,
   determining the linear equalization matrix according to the effective channel matrix comprises:
   for each first circulant matrices $A_n$, performing an Inverse Fast Fourier Transform (IFFT) on the first circulant matrices $A_n$ to obtain a first intermediate matrix $S_t$; inverting the first intermediate matrix $S_t$ to obtain a first inversed intermediate matrix $S_t^{-1}$; performing a Fast Fourier Transform (FFT) on the first inversed intermediate matrix $S_t^{-1}$ to obtain a second circulant matrix $B_q$; and
   determining the zero-forcing equalization matrix $W_{ZF}$ according to the second circulant matrices $B_q$.

8. The linear equalization method of claim 7, wherein, performing a Fast Fourier Transform (FFT) on the first inversed intermediate matrix $S_t^{-1}$ to obtain a second circulant matrix $B_q$ comprises:
   determining the second circulant matrix $B_q$ according to the following equation:

$$B_q = \frac{1}{N} FFT_{Mtx}(S_t^{-1})$$

wherein, $FFT_{Mtx}(\ )$ represents a Fast Fourier Transform operation on a set of matrices.

9. The linear equalization method of claim 7, wherein, inverting the first intermediate matrix $S_t$ to obtain a first inversed intermediate matrix $S_t^{-1}$ comprises:
   initializing an L matrix as $L=I_M$;
   initializing a U matrix as $U=0_M$;
   initializing an intermediate variable matrix as $Y=0_M$;
   initializing an auxiliary vector as $d=[d_{chan}, M-D_P]$; wherein, $d_{chan}=[D_1, D_2, D_3, \ldots, D_P]$ is a vector representing delays of the LTV channel; P represents a number of paths of the LTV channel; $D_1, D_2, D_3, \ldots, D_P$ represents a coordinate value of a delay of each path on a delay axis in the delay-Doppler domain;
   determining a first $M-D_P$ columns of the L matrix according to $L(i+D_P,i)=S_t(i+D_P,i)/S_t(i,i)$; where, $L(i+D_P, i)$ represents an element at a position of row $i+D_P$ and column i in the L matrix; and i is a first cyclic variable, where $i=1: M-D_P$;
   determining a first $M-D_P$ rows of the U matrix according to $U(\xi,:)=S_t(\xi,:)-\Sigma_{k=2}^{n}\Sigma_{j=1}^{M}L(\xi,\xi-D_k)U(\xi-D_k,j)$; where, $U(\xi,:)$ represents row $\xi$ of the U matrix; $S_t(\xi,:)$ represents row $\xi$ of the first intermediate matrix $S_t$; the vector $\xi$ increases from $D_p+1$ to $D_{p+1}$ one by one; and p is a second cyclic variable, where $p=1: P+1$;
   determining a last $D_P$ columns of the L matrix through an LU decomposition method;
   determining a last $D_P$ rows of the U matrix through the LU decomposition method;
   obtaining the first inversed intermediate matrix $S_t^{-1}$ according to the L matrix and the U matrix.

10. The linear equalization method of claim 9, wherein, obtaining the first inversed intermediate matrix $S_t^{-1}$ according to the L matrix and the U matrix comprises:
    setting a third cyclic variable n increasing from 1 to P one by one;
    in loop n, setting a vector k increasing from $d(n)+1$ to $d(n+1)$ one by one;
    wherein, $d(n)$ represents a $n^{th}$ element in the vector $d(n)$; $d(n+1)$ represents a $n+1^{th}$ element in the vector $d(n)$;
    calculating the row k of the intermediate variable matrix Y according to the following expression $Y(k,:)=I(k,:)-\Sigma_{i=1}^{n}L(k,k-d(i))Y(k-d(i),:)$;
    setting a fourth cyclic variable k increasing from $D_P+1$ to M one by one;
    in loop k, calculating row k of the intermediate variable matrix Y according to $Y(k,:)=I(k,:)-L(k,1:k-1)Y(1:k-1,:)$;
    setting a fifth cyclic variable t decreasing from N to 1 one by one;
    in loop t, setting a variable f represents a bigger one between $M-D_P$ and $k+1$;
    obtain row t of the inversed matrix $S_t^{-1}$ through $$S_t^{-1}(t,:) = Y(t,:) - \frac{U(t,f:M)X(f:M,:)}{U(t,t)}.$$

11. The linear equalization method of claim 2, wherein, the linear equalization matrix is a Minimum Mean Square Error (MMSE) equalization matrix $W_{MMSE}$; wherein,
    determining the linear equalization matrix according to the effective channel matrix comprises:
    determining a second intermediate matrix R according to the effective channel matrix and a transpose matrix of the effective channel matrix and a variance of channel noises;
    inverting the second intermediate matrix R to obtain a second inverted intermediate matrix $R^{-1}$; and
    multiplying the second inverted intermediate matrix $R^{-1}$ by the transpose matrix of the effective channel matrix to obtain the equalization matrix of the MMSE equalization $W_{MMSE}$.

12. The linear equalization method of claim 11, wherein, determining a second intermediate matrix R according to the effective channel matrix and a transpose matrix of the effective channel matrix and a variance of channel noises comprises:
    determining the second intermediate matrix R according to the following expression:

$$R=H_{eff}^{H}H_{eff}+\sigma^2 I$$

wherein, $H_{eff}^{H}$ represents the conjugate transpose matrix of the effective channel matrix $H_{eff}$; $\sigma^2$ represents the variance of channel noises; and I represents an identity matrix with a same dimension with the effective channel matrix $H_{eff}$.

13. The linear equalization method of claim 11, wherein, determining a second intermediate matrix R according to the effective channel matrix and a transpose matrix of the effective channel matrix and a variance of channel noises comprises:

determining the second intermediate matrix R according to the following expression:

$$R = \begin{bmatrix} \sum_{n=1}^{N} A_n^H A_{[n]_N} + \sigma^2 I & \sum_{n=1}^{N} A_n^H A_{[n+1]_N} & \cdots & \sum_{n=1}^{N} A_n^H A_{[n+N-1]_N} \\ \sum_{n=1}^{N} A_n^H A_{[n+N-1]_N} & \sum_{n=1}^{N} A_n^H A_{[n]_N} + \sigma^2 I & & \sum_{n=1}^{N} A_n^H A_{[n+N-2]_N} \\ \vdots & & \ddots & \vdots \\ \sum_{n=1}^{N} A_n^H A_{[n+1]_N} + \sigma^2 I & \sum_{n=1}^{N} A_n^H A_{[n+2]_N} + \sigma^2 I & \cdots & \sum_{n=1}^{N} A_n^H A_{[n]_N} + \sigma^2 I \end{bmatrix}$$

wherein, $[\bullet]_N$ represent a modulo operation; $[N]_N=N$.

14. The linear equalization method of claim 11, wherein, inverting the second intermediate matrix R to obtain a second inverted intermediate matrix $R^{-1}$ comprises:
  initializing an L matrix as $L=I_M$;
  initializing a U matrix as $U=0_M$;
  initializing an intermediate variable matrix as $Y=0_M$;
  initializing an auxiliary vector as $d=[d_{chan}, M-D_P]$; wherein, $d_{chan}=[D_1, D_2, D_3, \ldots, D_P]$ is a vector representing delays of the LTV channel; P represents a number of paths of the LTV channel; $D_1, D_2, D_3, \ldots, D_P$ represents a coordinate value of a delay of each path on a delay axis in the delay-Doppler domain;
  determining a first $M-D_P$ columns of the L matrix according to $L(i+D_P,i)=M(i+D_P,i)/M(i,i)$; where, $L(i+D_P, i)$ represents an element at a position of row $i+D_P$ and column i in the L matrix; and i is a first cyclic variable, where i=1: $M-D_P$;
  determining a first $M-D_P$ rows of the U matrix according to $U(\xi,:)=M(\xi,:)-\Sigma_{k=2}{}^n\tau_{j=1}{}^M L(\xi,\xi-D_k)U(\xi-D_k;:)$; where, $U(\xi,:)$ represents row of the U matrix; $S_r(\xi,:)$ represents row of the first intermediate matrix M; the vector increases from $D_p+1$ to $D_{p+1}$ one by one; and p is a second cyclic variable, where p=1: P+1;
  determining a last $D_P$ columns of the L matrix through an LU decomposition method;
  determining a last $D_P$ rows of the U matrix through the LU decomposition method;
  obtaining the second inversed intermediate matrix $R^{-1}$ according to the L matrix and the U matrix.

15. The linear equalization method of claim 14, wherein, obtaining the second inversed intermediate matrix $R^{-1}$ according to the L matrix and the U matrix comprises:
  setting a third cyclic variable n increasing from 1 to P one by one;
  in loop n, setting a vector k increasing from d(n)+1 to d(n+1) one by one;
  wherein, d(n) represents a $n^{th}$ element in the vector d; d(n+1) represents a $n+1^{th}$ element in the vector d;
  calculating the row k of the intermediate variable matrix Y according to the following expression $Y(k,:)=I(k,:)-L(k,k-d(i))Y(k-d(i),:)$;
  setting a fourth cyclic variable k increasing from $D_p+1$ to M one by one;
  in loop k, calculating row k of the intermediate variable matrix Y according to $Y(k,:)=I(k,:)-L(k,1:k-1)Y(1:k-1,:)$;
  setting a fifth cyclic variable t decreasing from N to 1 one by one;
  in loop t, setting a variable f represents a bigger one between $M-D_P$ and k+1;
  obtain row t of the inversed matrix $R^{-1}$ through $$R^{-1}(t,:) = Y(t,:) - \frac{U(t,f:M)X(f:M,:)}{U(t,t)}.$$

16. An electronic device, comprising a memory, a processor, and a computer program stored in the memory and executable on the processor, wherein the processor executes the computer program to implement the linear equalization method of claim 1.

17. A non-transitory computer-readable storage medium, wherein the non-transitory computer-readable storage medium stores computer instructions, and the computer instructions being used to make a computer execute the linear equalization method of claim 1.

* * * * *